(12) United States Patent
Ivanoff

(10) Patent No.: US 11,185,869 B2
(45) Date of Patent: Nov. 30, 2021

(54) METHOD AND APPARATUS FOR WASHING AND GRADING SAND

(71) Applicant: CDE Global Limited, Cookstown (GB)

(72) Inventor: Enda Ivanoff, Moy (GB)

(73) Assignee: CDE Global Limited, Cookstown (GB)

(*) Notice: Subject to any disclaimer, the term of this patent is extended or adjusted under 35 U.S.C. 154(b) by 304 days.

(21) Appl. No.: 16/469,819

(22) PCT Filed: Dec. 4, 2017

(86) PCT No.: PCT/EP2017/081393
§ 371 (c)(1),
(2) Date: Jun. 14, 2019

(87) PCT Pub. No.: WO2018/108605
PCT Pub. Date: Jun. 21, 2018

(65) Prior Publication Data
US 2019/0351429 A1 Nov. 21, 2019

(30) Foreign Application Priority Data
Dec. 14, 2016 (GB) .................................. 1621220.1

(51) Int. Cl.
*B03B 9/00* (2006.01)
*B01D 21/01* (2006.01)
(Continued)

(52) U.S. Cl.
CPC ................ *B03B 9/00* (2013.01); *B01D 21/01* (2013.01); *B01D 21/267* (2013.01); *B03B 5/04* (2013.01); *B03B 5/34* (2013.01); *B03D 3/06* (2013.01); *B08B 3/04* (2013.01)

(58) Field of Classification Search
CPC .... B03B 5/04; B03B 5/34; B03B 9/00; B01D 21/01; B01D 21/267; B07B 2230/01; B08B 3/04; B03D 3/06
See application file for complete search history.

(56) References Cited

U.S. PATENT DOCUMENTS 3,737,037 A 6/1973 Bone, III
4,709,862 A * 12/1987 Leidel ........................ B22C 5/18
164/5

(Continued)

FOREIGN PATENT DOCUMENTS

DE 4326200 2/1994
DE 4436639 4/1996
(Continued)

OTHER PUBLICATIONS

International Search Report of corresponding PCT Application No. PCT/EP2017/081393, dated Apr. 13, 2018.
(Continued)

*Primary Examiner* — Joseph C Rodriguez
(74) *Attorney, Agent, or Firm* — Gardner, Linn, Burkhart & Ondersma LLP

(57) ABSTRACT

An apparatus for washing and grading sand includes a first vibrating screen having a deck arranged to receive a feed material. Oversize material passes over the deck of the first vibrating screen for collection as a first product, and undersize material and water are collected in a sump of the first vibrating screen before being pumped to a hydrocyclone. A second vibrating screen receives an underflow from the hydrocyclone upon a deck thereof, with oversize material passing over the deck of the second vibrating screen for collection as a second product. An overflow from the hydrocyclone passes into a settling tank, and a water storage reservoir receives water overflowing from the settling tank while sludge is collected and removed from a lower end of
(Continued)

the settling tank. Water is passed from the water storage reservoir to the first and second vibrating screens to wash and fluidise material thereon.

18 Claims, 3 Drawing Sheets

(51) Int. Cl.
*B01D 21/26* (2006.01)
*B03B 5/04* (2006.01)
*B03B 5/34* (2006.01)
*B03D 3/06* (2006.01)
*B08B 3/04* (2006.01)

(56) References Cited

U.S. PATENT DOCUMENTS

| | | |
|---|---|---|
| 4,772,400 A | 9/1988 | Kreyenberg |
| 9,987,637 B2 * | 6/2018 | Convery .................. B03B 5/48 |
| 10,399,123 B2 * | 9/2019 | Ivanoff .................. E21B 21/065 |
| 2005/0205496 A1 * | 9/2005 | Pullman ............. B01D 21/2433 210/712 |
| 2019/0247861 A1 * | 8/2019 | Ivanoff .................. B03B 11/00 |
| 2021/0094044 A1 * | 4/2021 | Convery .................. B03B 9/00 |

FOREIGN PATENT DOCUMENTS

| | | |
|---|---|---|
| GB | 2523657 | 9/2015 |
| GB | 2528257 | 1/2016 |
| WO | 2017/125306 | 7/2017 |

OTHER PUBLICATIONS

UK Search Report of corresponding Application No. GB1621220.1, dated Apr. 4, 2017.
Commonly-owned unpublished, U.S. Appl. No. 16/071,234, filed Jul. 19, 2018, which corresponds to PCT Publication No. WO 2017/125306, including claims filed via Preliminary Amendment on Jul. 19, 2018.

* cited by examiner

METHOD AND APPARATUS FOR WASHING AND GRADING SAND

CROSS REFERENCE TO RELATED APPLICATIONS

The present application is a § 371 national stage of International Application PCT/EP2017/081393, filed Dec. 4, 2017, which claims priority benefit to U.K. Pat. Application Ser. No. 1621220.1, filed Dec. 14, 2016, both of which are hereby incorporated herein by reference in their entireties.

FIELD OF THE INVENTION

This invention relates to a method and apparatus for washing and grading particulate material, in particular sand, and in particular to a method and apparatus for washing and grading sand having improved water management.

BACKGROUND OF THE INVENTION

Sand is typically washed and graded on a combination of vibrating screens and hydrocyclones to produce washed sand products having a predetermined grain size or range of grain size.

A typical vibrating screen includes a frame, defined by a pair of substantially parallel side walls interconnected by transversely extending bridging members, upon which is mounted a polyurethane deck having small openings or slots for water and/undersize particles to pass through. The frame is typically mounted on a base via resilient linkages, such as springs, and the frame, and thus the deck, is typically vibrated by means of a pair of counter rotating rotors defining eccentric masses, driven by one or more drive motors, to impart circular or reciprocating vibrating motion to the deck. The deck is vibrated at high frequency to shake out excess water through the openings and to convey the material across the deck to one end of the screen whereby the dry material is discharged, typically over the top of a weir, onto a conveyor or into a collection hopper and/or to cause undersize material (and water) to pass through the openings to be collected in a sump below the deck.

A hydrocyclone is a device used to separate particles in a liquid suspension based on the ratio of their centripetal force to fluid resistance. This ratio is high for coarse particles and low for fine particles. A hydrocyclone typically includes a cylindrical section having an inlet for supplying a feed slurry into the hydrocyclone tangentially, and a conical base. Outlets are provided at upper and lower ends of the hydrocyclone. Underflow, containing the coarser fraction, passes out of the lower outlet while overflow, containing the finer fraction and most of the water, passes out of the outlet at the upper end of the hydrocyclone.

Most sand washing and grading plants are very large, including different stages including multiple grading and dewatering screens and hydrocyclones, and typically require a large volume of water to fluidise the sand in each stage of the process and to transfer the sand between different stages of the process and considerable energy usage to pump the water and/or fluidised sand or sludge between different stages of the process, often located at different heights.

SUMMARY OF THE INVENTION

According to a first aspect of the present invention there is provided a method of washing and grading particulate material including the steps of washing and grading a feed material on a first vibrating screen, collecting oversize material from the first vibrating screen as a first product and collecting undersize material and water from the first vibrating screen in a sump; pumping the undersize material and water from the sump into a first hydrocyclone, thereby removing fine contaminants from the material; passing the underflow from the first hydrocyclone onto a second vibrating screen, collecting oversize material from the second vibrating screen as a second product; passing the overflow from at least the first hydrocyclone into a settling tank, collecting sludge in a lower end of the settling tank and removing the sludge therefrom; collecting water overflowing from the settling tank into a water storage reservoir and delivering water from the storage reservoir to the first and second vibrating screens.

A portion of the overflow from at least the first hydrocyclone may be added to the sump of the first and/or second vibrating screens to control the water level and/or content of the material in the sump.

Undersize material and water from the second vibrating screen may be collected in the sump, wherein the first and second vibrating screens include respective sections of a split screen vibrating screen. In an alternative embodiment undersize material and water from the second vibrating screen may be collected in a second sump, material and water from the second sump being passed into a second hydrocyclone.

The method optionally includes the further step of adding a flocculent to the settling tank to facilitate the settling out of suspended solid material in the settling tank.

Water from the water storage reservoir may be added to the feed material in a wash box upstream of the first vibrating screen.

According to a further aspect of the present invention there is provided an apparatus for washing and grading sand including a first vibrating screen having a deck arranged to receive a feed material, oversize material passing over the deck of the first vibrating screen for collection as a first product and undersize material and water being collected in a first sump of the first vibrating screen before being pumped to a first hydrocyclone; a second vibrating screen receiving an underflow from the hydrocyclone upon a deck thereof, oversize material passing over the deck of the second vibrating screen for collection as a second product; an overflow from at least the first hydrocyclone being passed into a settling tank, a water storage reservoir receiving water overflowing from the settling tank while sludge is collected and removed from a lower end of the settling tank, water being passed from the water storage reservoir to the first and second vibrating screens to wash and fluidise material thereon.

Water from the water storage reservoir may be added to the feed material in a wash box upstream of the first vibrating screen.

In one embodiment a portion of the overflow from at least the first hydrocyclone may be added to the sump of the first and/or second vibrating screens to control the water content of the material in the sump or sumps.

In one embodiment the first and second vibrating screens may include respective sides of a split deck vibrating screen, the first sump being common to both of the first and second vibrating screens. In an alternative embodiment the first vibrating screen may have a first sump receiving undersize material and water therefrom and the second vibrating screen may have a second sump, separate from the first sump, receiving undersize material and water therefrom, the first sump having a respective pump for pumping material and water therefrom into the first hydrocyclone, the second sump having a respective pump for pumping material and water therefrom into a second hydrocyclone, the overflow from both the first and second hydrocyclones being collected in the settling tank.

A dosing apparatus may be provided for adding a flocculent to the settling tank to facilitate the settling out of suspended solid material in the settling tank.

A first flow control valve may be provided for controlling the addition of a water from the storage reservoir to the first vibrating screen and a second control valve may be provided for controlling the addition of water from the storage reservoir to the second vibrating screen.

The first and second vibrating screens, at least the first hydrocyclone, the settling tank and water storage tank may be mounted on a common chassis.

In one embodiment the apparatus may further include a further hydrocyclone receiving undersize material and water from the sump of the second vibrating screen, the underflow from the further hydrocyclone being delivered onto the deck of a third vibrating screen, wherein the oversize material from the third vibrating screen is collected as a third product. The second and third vibrating screens may include respective sides of a split deck vibrating screen having a common sump.

These and other objects, advantages and features of the invention will become apparent upon review of the following specification in conjunction with the drawings.

BRIEF DESCRIPTION OF THE DRAWINGS

An apparatus for washing and grading sand with improved water management in accordance with an embodiment of the present invention will now be described, by way of example only, with reference to the accompanying drawings, in which.

DESCRIPTION OF THE PREFERRED EMBODIMENTS

Figure 1:
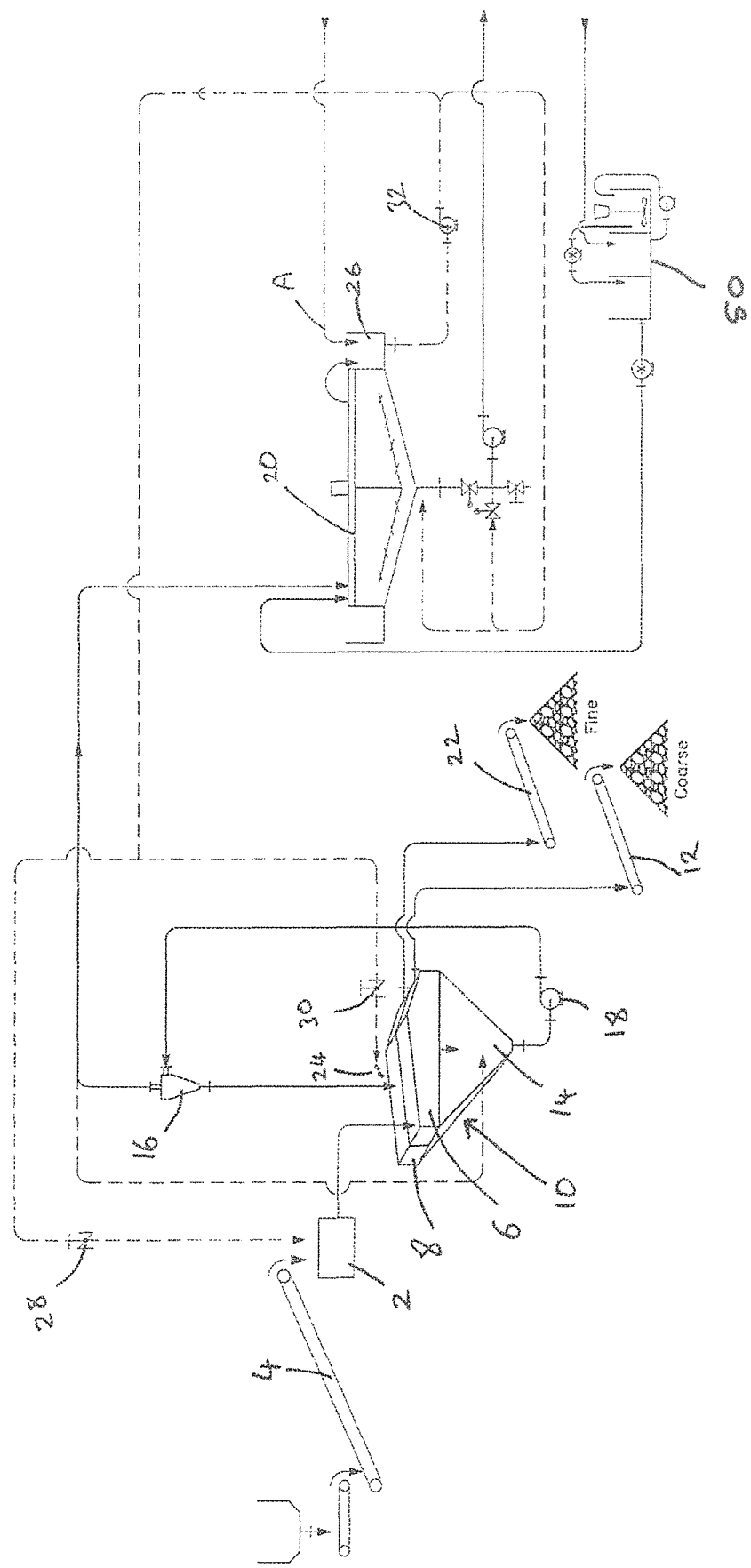
FIG. 1 is a schematic illustration of an apparatus for washing and grading sand in accordance with a first embodiment of the present invention.

An apparatus for washing and grading sand in accordance with an embodiment of the present invention is illustrated in the drawings.

As illustrated in FIG. 1, an apparatus for washing and grading sand in accordance with a first embodiment of the present invention includes a wash box 2 for receiving feed material to be washed and graded, the feed material being conveyed into the wash box via a suitable belt conveyor 4. Water is added to the material in the wash box 2 and the fluidised material is delivered onto a first deck 6 of a split deck vibrating screen 10 for grading and dewatering the sand.

The first deck 6 of the split deck screen 10 has relatively large apertures formed therein, wherein undersize sand and water passes through the apertures in the deck 6 while oversize material passes over the deck 6, being washed and dewatered thereon, before being delivered onto a first conveyor 12 to be conveyed onto a first stock pile as a first sand product, including a course grade of sand, for example having a +5 mm particle size.

The undersize material and contaminated water collected in the sump 14 of the split deck screen is pumped to a hydrocyclone 16 by means of a suitable pump 18. In the hydrocyclone 16 the sand is washed and fine contaminants and silt are separated from the remaining sand.

An underflow from the hydrocyclone 16, containing partially washed sand, having fine contamination and silts removed therefrom, is passed onto a second deck 8 of the split deck screen 10, having relatively fine apertures formed therein, remaining relatively fine material, such as silt, and water passing through the apertures of the second deck 8 into the sump 14 (or optionally into a separate sump). The second deck 8 effectively operates as a dewatering screen due to the relatively small size of the apertures formed therein.

The overflow from the hydrocyclone 16, containing a slurry of fine contaminants, mainly silt, removed from the sand, is passed to a settling tank 20 for recycling, as will be described below in more detail.

Oversize material is dewatered on the second deck 8 of the split deck screen 10 and passes over a downstream end of the second deck 8 onto a second conveyor 22 to be conveyed onto a second stockpile as a second sand product, including a fine grade of sand, for example having a particle size of between 0.075 mm and 5 mm.

Further water is added to the second deck 8 of the split deck screen 10 via spray bars 24 to maintain fluidisation of the sand to wash the sand.

Figure 2:
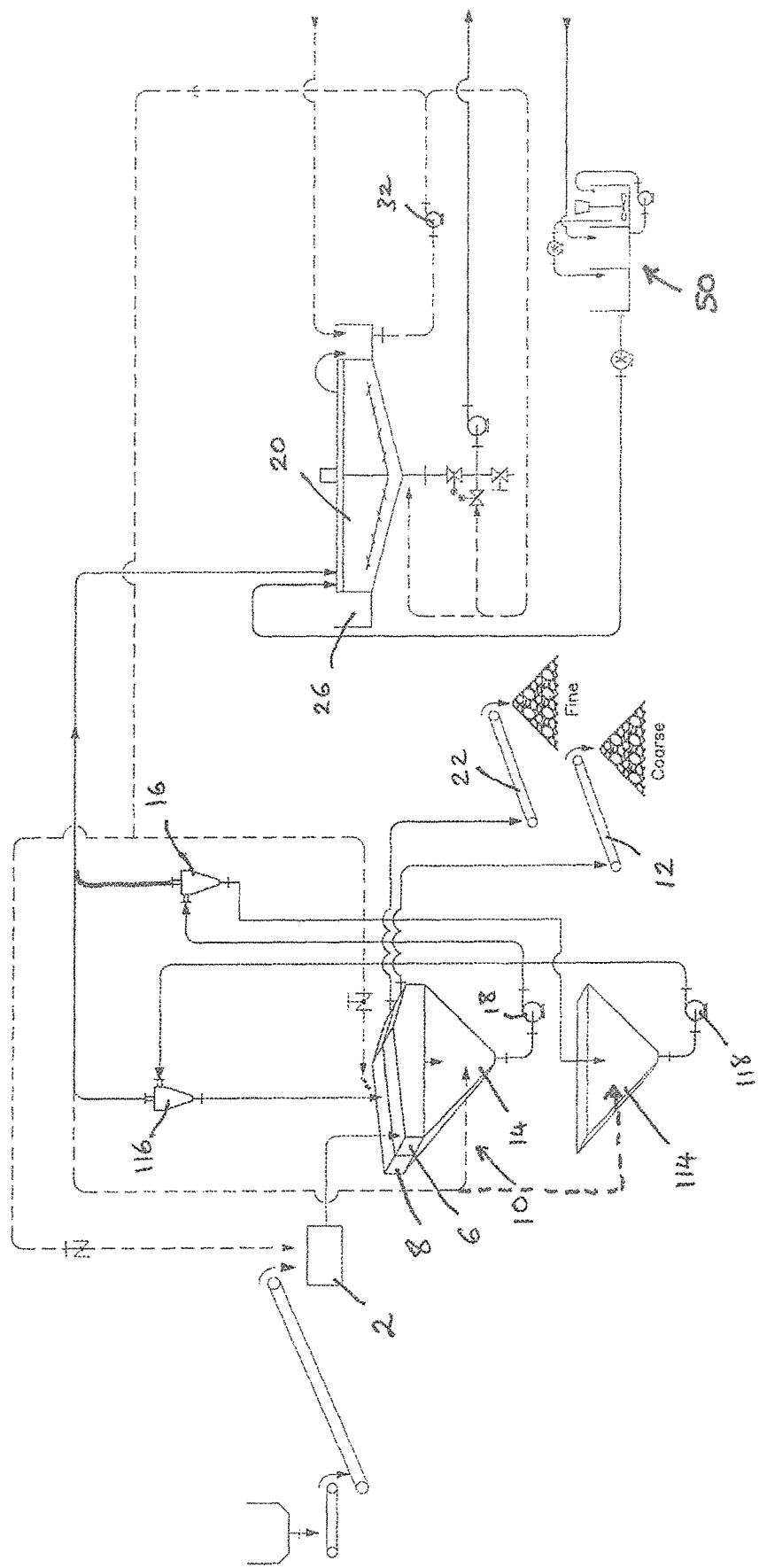
FIG. 2 is a schematic illustration of an apparatus for washing and grading sand in accordance with a second embodiment of the present invention.

The first and second decks 6,8 of the split deck screen 10 may have a common sump 14 having a slurry pump 18 for pumping slurry from the sump 14 to the hydrocyclone 16. In an alternative embodiment, each of the first and second decks 6,8 of the split deck screen 10 may have a separate sump (not shown) and respective pump for supplying material from the respective sump to the hydrocyclone 16 or to separate first and second hydrocyclones.

Where the feed material contains 15% or less silt only one pass of the hydrocyclone may be required to remove the silt therefrom. In such case only material from the sump of the first deck 6 need be supplied to the hydrocyclone 16. However, for feed material containing more than 15% silt, two hydrocyclone passes may be required to remove the silt from the sand. In such case, in a second embodiment of the invention shown in FIG. 2, in a first pass, material may be pumped from the sump of the first deck 6 to a first hydrocyclone 16, the underflow from the first hydrocyclone 16 passing into a further sump 114 before being pumped by a further pump 118 into a second hydrocyclone 116, the underflow from the second hydrocyclone 116 being delivered onto the second deck 8 of the split screen deck while the overflow from both the first and second hydrocyclones 16,116 is passed to the settling tank for recycling.

A portion of the overflow from the (or each) hydrocyclone 16,116 may be passed back to the sump 14 of the split deck screen 10 and/or into the further sump 114 to maintain the desired water level and/or water content in the (or each) sump.

As discussed above, the overflow from the (or each) hydrocyclone 16,116 is passed into a settling tank 20. A suitable flocculent may be added to the settling tank to facilitate the settling out of the sludge from the water via a mixing and dosing apparatus 50. The sludge collected in the bottom of the settling tank 20 may be pumped for disposal, for example is a sludge pond, while water overflowing from the settling tank 20 is collected in a water storage reservoir 26, from which it may be recycled for use in the washing and grading process, being added to the sand as it is passed onto each deck 6,8 of the split deck screen 10 and into the wash box 2. A controller may be provided for controlling the addition of water A to the water storage reservoir 26 from a separate water supply to maintain the water level within the water storage reservoir 26, if required.

Optionally, the water storage reservoir 26 is arranged around the periphery of the settling tank 20. The settling tank may have a double skinned outer wall such that the water storage reservoir 26 is defined between the double skins of the outer wall of the settling tank 20.

The settling tank 20 and the water storage reservoir 26 may be arranged at substantially the same height as the split deck screen 10 and are located adjacent or close to the split deck screen 10 so that water can easily pumped from the water storage reservoir 26 to the split deck screen 10 without requiring powerful pumps. Valves 28,30 and a pump 32 may be provided for controlling the supply of water from the water storage reservoir 26 to the first and second decks 6,8 of the split deck screen 10 respectively.

The various components of the apparatus are integrated into a common system, and may be mounted a common chassis, such as mounted on a trailer to facilitate transportation with minimum disassembly. The apparatus may be adapted to be containerised for transportation with minimum disassembly.

Optionally, the split deck screen 10 and the settling tank 20 are mounted adjacent to one another on a common elongate chassis. The first and second conveyors 4,22 conveying the first and second sand products to respective stockpiles may be mounted on either side of the chassis, extending in substantially opposite directions, outwardly from either side of the chassis.

As such, embodiments of the present invention provide an improved sand washing and grading apparatus that can provide two different grades of sand product with low water consumption and in a compact and efficient arrangement.

The apparatus may include a common controller with integrated power supply, thus making the apparatus completely self contained.

Figure 3:
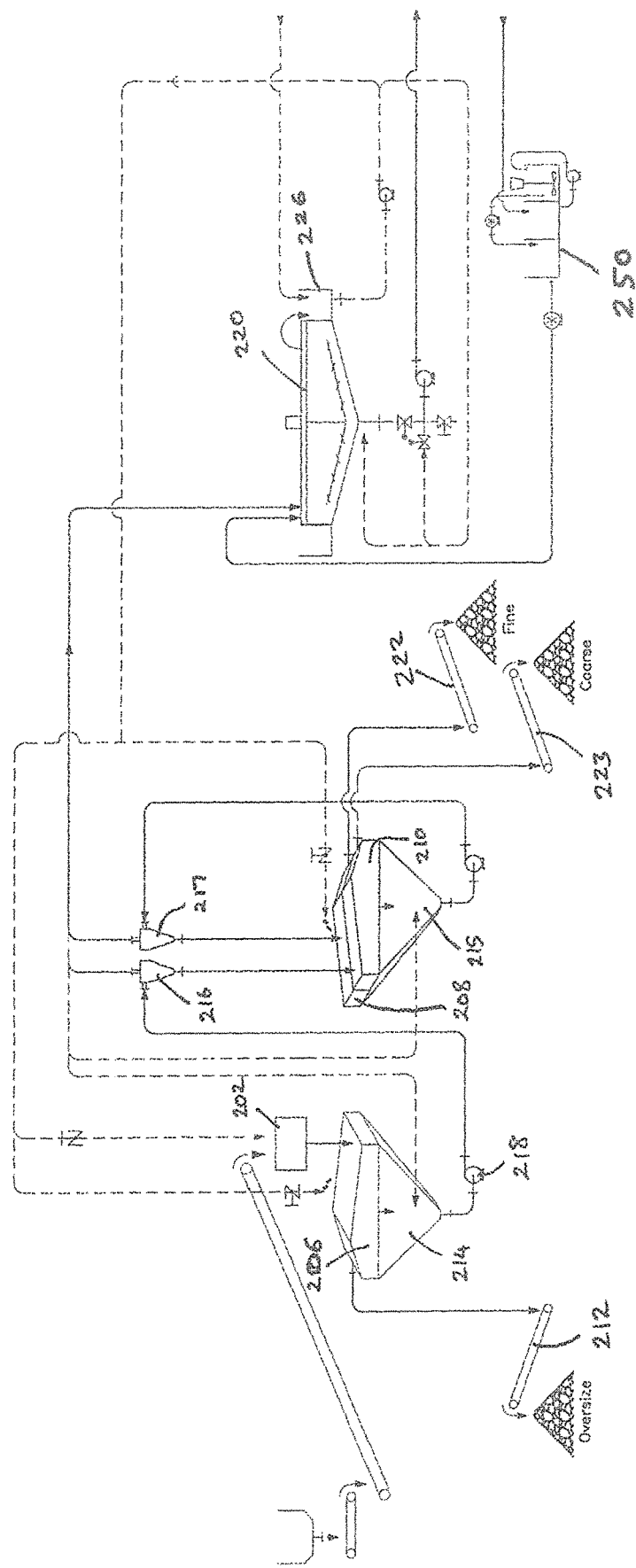
FIG. 3 is a schematic illustration of an apparatus for washing and grading sand in accordance with a third embodiment of the present invention.

In a third embodiment, shown in FIG. 3, an additional grading stage may be added to enable the production of three grades of washed sand. In such embodiment, the fluidised feed material from the wash box 202 is fed onto the deck of a first screen 206, dewatered oversize sand being delivered onto a first conveyor 212 for delivery onto a first stockpile as a first sand product, including a course grade of sand, or as trash.

Undersize material and water collected in the sump 214 of the first screen 206 is pumped into a first hydrocyclone 216 by a suitable pump 218. The underflow from the first hydrocyclone 216 is delivered onto the deck of a second screen 208, whereby a dewatered oversize sand from the second screen is delivered onto a second conveyor 222 to be delivered onto a second stockpile as a second sand product, including an intermediate grade of sand.

Undersize sand and water from the second screen 208 is collected in a sump 215 of the second screen 218 and is pumped to a second hydrocyclone 217. The underflow from the second hydrocyclone 217 is delivered onto a third screen 210, operating primarily as a dewatering screen. The dewatered sand (oversize material) from the deck of the third screen 210 is delivered onto a third conveyor 223 to be delivered onto a third stockpile as a third product, including a fine grade of sand.

As shown in FIG. 3, the second and third screens 208 and 210 may include respective sides of a split deck screen having a common sump 215.

The overflow from each of the first and second hydrocyclones 216,217 is delivered into a settling tank 220 for recycling, the settling tank 220, having a flocculant dosing and mixing device 250 associated therewith, whereby silt and sludge is brought out of suspension to be collected in and removed from the bottom of the settling tank 220, while water from the settling tank 220 overflows into a peripheral water storage reservoir 226 surrounding the settling tank 220 before being pumped back to the screens 206,208,210 and the wash box 202. Additional water may be added to the water storage reservoir 226 as required.

As with the previous embodiment, a portion of the overflow from each of the hydrocyclones 216,217 may be passed into the sumps 214,215 of the screens 206,208,210 to control the water level/water content therein.

The invention is not limited to the embodiment(s) described herein but can be amended or modified without departing from the scope of the present invention, which is intended to be limited only by the scope of the appended claims as interpreted according to the principles of patent law including the doctrine of equivalents.

The invention claimed is:

1. A method of washing and grading particulate material comprising:
   washing and grading a feed material on a first vibrating screen;
   collecting oversize material from the first vibrating screen as a first product and collecting undersize material and water from the first vibrating screen in a first sump;
   pumping the undersize material and water from the first sump into a first hydrocyclone, thereby removing fine contaminants from the material;
   passing the underflow from the first hydrocyclone onto a second vibrating screen, and collecting oversize material from the second vibrating screen as a second product;
   passing the overflow from at least the first hydrocyclone into a settling tank, and collecting sludge in a lower end of the settling tank and removing the sludge therefrom;
   collecting water overflowing from the settling tank into a water storage reservoir and delivering water from the storage reservoir to the first and second vibrating screens; and
   collecting undersize material and water from the second vibrating screen in the first sump;
   wherein the first and second vibrating screens comprise respective sections of a split screen vibrating screen.

2. The method of claim 1, comprising adding a portion of the overflow from at least the first hydrocyclone to the sump of the first and/or second vibrating screens to control the water level and/or content of the material in the sump or sumps.

3. The method of claim 1, comprising collecting undersize material and water from the second vibrating screen in a second sump and passing material and water from the second sump into a second hydrocyclone.

4. The method of claim 1, comprising adding a flocculant to the settling tank to facilitate the settling out of suspended solid material in the settling tank.

5. The method of claim 1, comprising adding water from the water storage reservoir to the feed material in a wash box upstream of the first vibrating screen.

6. An apparatus for washing and grading sand comprising:
a first vibrating screen having a deck arranged to receive a feed material, said first vibrating screen configured so that oversize material passing over said deck of said first vibrating screen can be collected as a first product, and undersize material and water can be collected in a first sump of said first vibrating screen before being pumped to a first hydrocyclone;
a second vibrating screen receiving an underflow from said hydrocyclone upon a deck thereof, said second vibrating screen configured so that oversize material passing over said deck of said second vibrating screen can be collected as a second product;
a settling tank configured to receive an overflow from at least said first hydrocyclone; and
a water storage reservoir for receiving water overflowing from said settling tank while sludge is collected and removed from a lower end of said settling tank, wherein water passed from said water storage reservoir to said first and second vibrating screens to washes and fluidizes material thereon;
wherein said first and second vibrating screens comprise respective sides of a split deck vibrating screen, said first sump being common to said first and second vibrating screens.

7. The apparatus of claim 6, wherein water from said water storage reservoir is added to the feed material in a wash box upstream of said first vibrating screen.

8. The apparatus of claim 6, wherein a portion of the overflow from at least said first hydrocyclone is added to said sump of said first and/or second vibrating screens to control the water content of the material in said sump or sumps.

9. An apparatus for washing and grading sand comprising:
a first vibrating screen having a deck arranged to receive a feed material, said first vibrating screen configured so that oversize material passing over said deck of said first vibrating screen can be collected as a first product, and undersize material and water can be collected in a first sump of said first vibrating screen before being pumped to a first hydrocyclone;
a second vibrating screen receiving an underflow from said hydrocyclone upon a deck thereof, said second vibrating screen configured so that oversize material passing over said deck of said second vibrating screen can be collected as a second product;
a settling tank configured to receive an overflow from at least said first hydrocyclone; and
a water storage reservoir for receiving water overflowing from said settling tank while sludge is collected and removed from a lower end of said settling tank, wherein water passed from said water storage reservoir to said first and second vibrating screens to washes and fluidizes material thereon;
wherein said first vibrating screen has a first sump receiving undersize material and water therefrom and said second vibrating screen has a second sump, separate from said first sump, receiving undersize material and water therefrom, said first sump having a respective pump for pumping material and water therefrom into said first hydrocyclone, said second sump having a respective pump for pumping material and water therefrom into a second hydrocyclone, the overflow from both said first and second hydrocyclones being collected in said settling tank.

10. The apparatus of claim 6, further comprising a dosing apparatus for adding a flocculent to said settling tank to facilitate the settling out of suspended solid material in said settling tank.

11. The apparatus of claim 6, wherein a first flow control valve is provided for controlling the addition of a water from said storage reservoir to said first vibrating screen and a second control valve is provided for controlling the addition of water from said storage reservoir to said second vibrating screen.

12. The apparatus of claim 6, wherein said first and second vibrating screens, at least said first hydrocyclone, said settling tank and said water storage reservoir are mounted on a common chassis.

13. The apparatus of claim 6, further comprising a further hydrocyclone configured to receive undersize material and water from said sump of said second vibrating screen, the underflow from said further hydrocyclone being delivered onto said deck of a third vibrating screen, wherein the oversize material from the third vibrating screen is collected as a third product.

14. The apparatus of claim 13, wherein said second and third vibrating screens comprise respective sides of a split deck vibrating screen having a common sump.

15. An apparatus for washing and grading sand comprising:
a first vibrating screen having a deck arranged to receive a feed material, said first vibrating screen configured so that oversize material passing over said deck of said first vibrating screen can be collected as a first product, and undersize material and water can be collected in a first sump of said first vibrating screen before being pumped to a first hydrocyclone;
a second vibrating screen receiving an underflow from said hydrocyclone upon a deck thereof, said second vibrating screen configured so that oversize material passing over said deck of said second vibrating screen can be collected as a second product;
a settling tank configured to receive an overflow from at least said first hydrocyclone; and
a water storage reservoir for receiving water overflowing from said settling tank while sludge is collected and removed from a lower end of said settling tank, wherein water passed from said water storage reservoir to said first and second vibrating screens to washes and fluidizes material thereon;
wherein said first and second vibrating screens comprise respective sides of a split deck vibrating screen, said first sump being common to said first and second vibrating screens;
wherein said first and second vibrating screens, at least said first hydrocyclone, said settling tank and said water storage reservoir are mounted on a common chassis; and
wherein said settling tank and said water storage reservoir are arranged at substantially the same height as the split deck screen.

16. The apparatus of claim 15, wherein water from said water storage reservoir is added to the feed material in a wash box upstream of said first vibrating screen.

17. The apparatus of claim 15, wherein a portion of the overflow from at least said first hydrocyclone is added to said sump of said first and/or second vibrating screens to control the water content of the material in said sump or sumps.

18. The apparatus of claim 15, further comprising a further hydrocyclone configured to receive undersize material and water from said sump of said second vibrating screen, the underflow from said further hydrocyclone being delivered onto said deck of a third vibrating screen, wherein the oversize material from the third vibrating screen is collected as a third product.

\* \* \* \* \*